No. 882,444. PATENTED MAR. 17, 1908.
H. H. BALLIET.
FRICTION PULLEY.
APPLICATION FILED NOV. 4, 1907.

2 SHEETS—SHEET 1.

WITNESSES
J. A. Brophy

INVENTOR
Horace H. Balliet
BY
ATTORNEYS

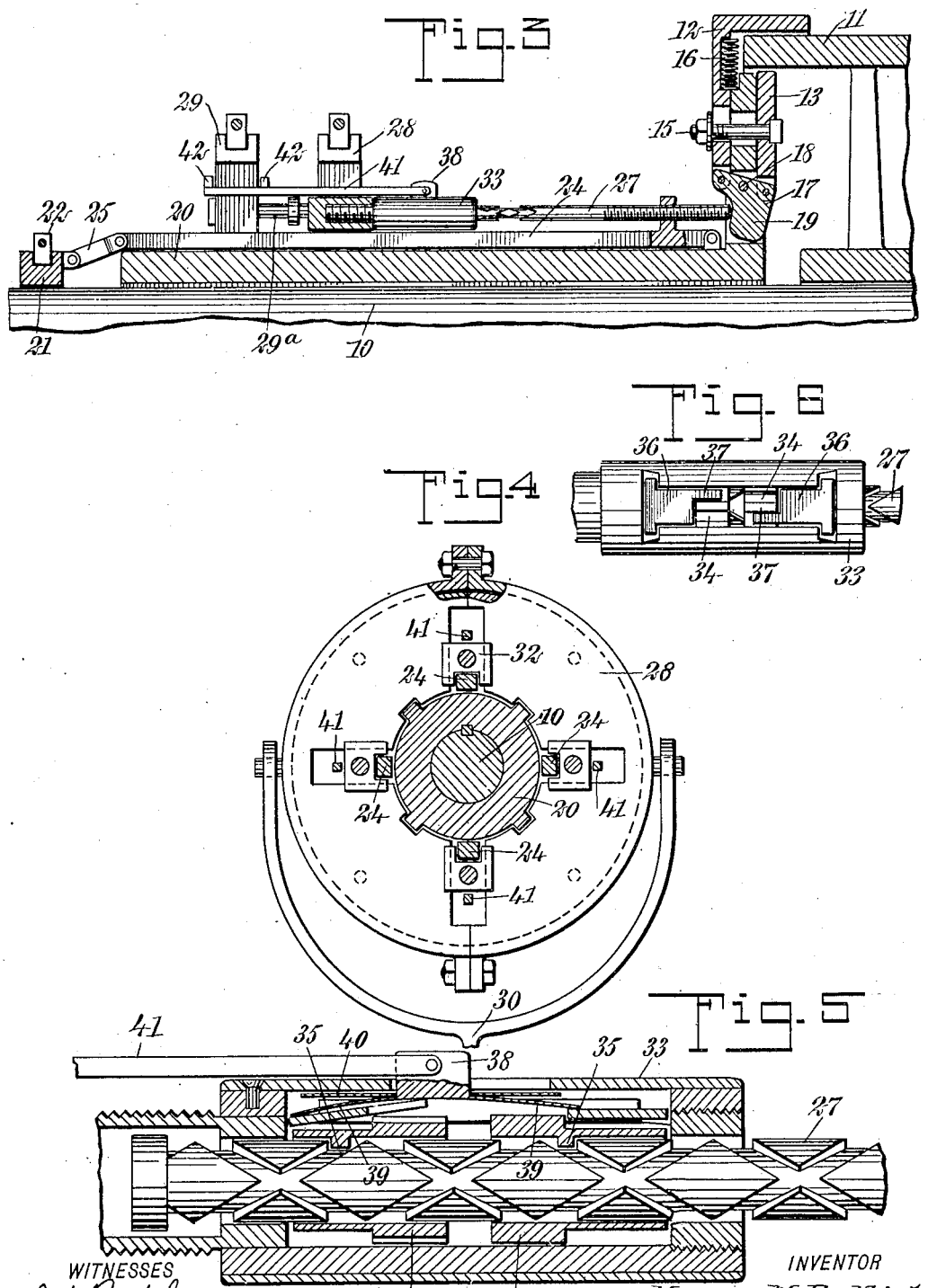

UNITED STATES PATENT OFFICE.

HORACE H. BALLIET, OF COPLAY, PENNSYLVANIA.

FRICTION-PULLEY.

No. 882,444.  Specification of Letters Patent.  Patented March 17, 1908.

Application filed November 4, 1907. Serial No. 400,668.

*To all whom it may concern:*

Be it known that I, HORACE H. BALLIET, a citizen of the United States, and a resident of Coplay, in the county of Lehigh and State of Pennsylvania, have invented a new and Improved Friction-Pulley, of which the following is a full, clear, and exact description.

This invention is an improvement in friction pulleys, relating principally to the operating mechanism therefor, and having for an object primarily to provide means operable during the revolution of the pulley, and shaft which carries it, for adjusting the said mechanism to increase or decrease the frictional engagement with the pulley, whereby it is unnecessary to stop the line shaft for this purpose.

Reference is to be had to the accompanying drawings forming a part of this specification, in which similar characters of reference indicate corresponding parts in all the views.

Figure 1:
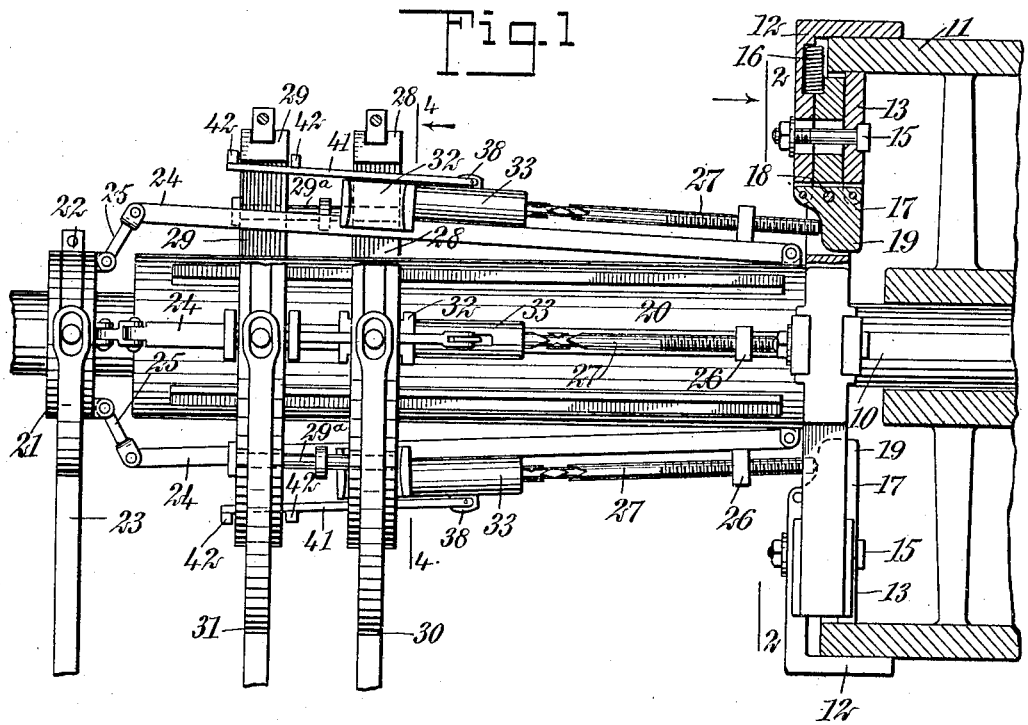
Figure 2:
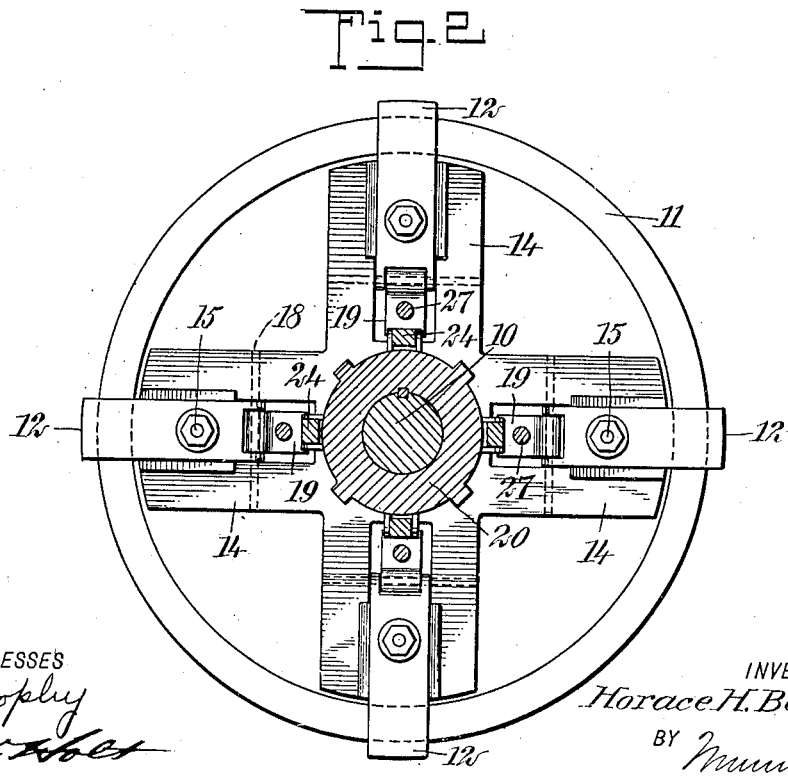

Figure 1 is a side elevation of a friction pulley partly in central vertical section and with my improvement applied thereto; Fig. 2 is a cross-section of the same on the line 2—2 of Fig. 1, looking in the direction of the arrow; Fig. 3 is a fragmentary longitudinal central section of the pulley and operating mechanism therefor, showing the latter in a position when the pulley is disengaged; Fig. 4 is a cross-section on the line 4—4 of Fig. 1, looking in the direction of the arrow; Fig. 5 is a longitudinal central section through the mechanism for revolving one of the operating screws; and Fig. 6 is a plan of the same on a reduced scale.

It frequently happens in shops, mills, factories, etc., that the friction pulley employed in driving the line shaft from the engine, is in need of adjustment to prevent it from slipping, which makes it necessary to stop the line shaft and thus throw the entire plant out of operation until this adjustment is effected. My invention contemplates the effecting of this adjustment without loss of time, by performing the same during the revolution of the shaft.

In the accompanying drawings 10 indicates the line shaft on which is journaled a pulley 11, the circumference or rim of which is arranged between clamping-jaws 12 and 13, a pair of these jaws being slidably carried at the opposite sides of each of the radially slotted arms 14, and are held in sliding engagement therewith by a bolt 15. Each jaw 12 is substantially L-shaped to engage the pulley exteriorly, and is normally forced out of contact therewith, as is also the jaw 13 with the inside of the pulley, by a spring 16, the latter being seated in a recess and bearing at its opposite ends on the arm 14 and the jaw 12.

The inner ends of each pair of jaws 12 and 13 are connected by a lever 17, fulcrumed in the slot of the arm on a pin 18, and having an inwardly-projecting portion 19. The arms 14 are integrally or otherwise rigidly attached to an extended hub 20, which in turn is keyed or otherwise secured to the line shaft 10, as clearly shown in Fig. 2. In advance of the hub 20, a sleeve 21 is slidable on the line shaft, and is grooved for receiving a ring 22 which is connected at diametrically opposite points between the forks of a pivoted operating lever 23.

The sleeve 21 is connected with levers 24, through the intermediary of links 25, which are equal in number to the sets of clamping-jaws for the pulley, and the free ends of the levers 24 are in turn pivoted to the hub 20 adjacent to the levers 17, near which points they are provided with outwardly-projecting lugs 26, the latter being provided with threaded apertures for receiving adjusting-screws 27 which, as shown in Figs. 1 and 2, are adapted to bear directly on the beveled or rounded edges of the projections 19. It is apparent from this construction that when the sleeve 21 is shifted in the direction of the pulley by the lever 23, to the position shown in Fig. 1, the rim of the pulley will be clamped between the several pairs of jaws carried by the radially slotted arm 14, and that the frictional engagement of these jaws with the pulley may be increased and decreased by the adjustment of the screws 27.

The construction thus far described is in substance old, my invention relating particularly to the provision of means for adjusting the screws 27 while the line shaft and pulley are revolving. This I accomplish by the foling construction.

Keyed or otherwise slidably fixed to the hub 20 are circumferentially grooved heads or sleeves 28 and 29, each having an encircling ring respectively connected at diametrically opposite points between the forked ends of pivoted shifting levers 30 and 31. The sleeves 28 and 29 as best shown in Fig. 4 are also radially slotted to correspond to the slots of the arms 14 through which pass the levers 24, and in which are guided in the slots of the sleeve 28, blocks 32 having reduced central portions and threadedly connected with nuts 33, the latter receiving the extended ends of the screws 27 which, as best shown in Fig. 5, are provided with crossed threads running in opposite directions. Each nut 33 contains oppositely-disposed gears 34 surrounding the double threaded portion of its respective screw 27, and is provided with inwardly-projecting teeth 35 which respectively engage the right-hand thread and the left-hand thread of the screw.

At the outside of the gears 34 the casing of the nut 33 carries tilting plates 36 having fingers 37 adapted to engage the teeth of the gears when the said plates are disposed in parallelism to the screw. For alternately tilting these plates, whereby the screw may be caused to revolve in opposite directions when the nuts 33 are reciprocated, a slide 38 movable in a longitudinal slot in the nut-casing is provided with spring-arms 39 bearing on the outer faces of the said plates 36. The slide 38 is additionally provided with a plate 40 which keeps the slot in the nut-casing closed as the said slide is reciprocated.

The slides 38 of the several nuts are reciprocated by the operation of the sleeve 29 which, as will be observed in Figs. 1 and 3, is slidable between the headed portions of bolts or studs 29ª carried by the sleeve 28, and is connected with each slide by a link 41, each link passing through the alining radial slots of the sleeves and is provided with lugs 42 engaging the sleeve 29; this construction while giving the sleeve 29 a limited sliding movement relative to the sleeve 28, at the same time relieves the links 41 of the pull on the sleeve 29 incident to forcing the nuts 33 forward.

In the operation of my improvement should the pulley be slipping on the line shaft, the shifting lever 31 is moved to connect the proper gear 34 with the nut 33 according to the direction in which the screws 27 are to be revolved, and the said screws are then revolved by operating the shifting-lever 30 to reciprocate the nuts 33.

It will be apparent that my invention may be applied to other mechanisms than that herein shown, and that the detail construction of the same may be modified without departing from the nature of my improvement as defined in the claims annexed.

Having thus described my invention, I claim as new and desire to secure by Letters Patent:

1. The combination of a shaft, a pulley journaled on the shaft, means for frictionally securing the pulley to the shaft, including an operating mechanism therefor having a device revoluble with the shaft, and means operable during the revolution of the shaft for adjusting said device to increase or decrease the frictional engagement with the pulley.

2. The combination of a shaft, a pulley journaled on the shaft, means for frictionally securing the pulley to the shaft, an operating mechanism for said means including a screw revoluble with the shaft, and means operable during the revolution of the shaft for adjusting said screw to increase or decrease the frictional engagement with the pulley.

3. The combination of a shaft, a pulley journaled on the shaft, clamping-jaws for engaging the rim of the pulley and securing it to the shaft, means for operating said jaws including a screw revoluble with the shaft, and means operable during the revolution of the shaft for adjusting said screw.

4. The combination of a shaft, a pulley journaled on the shaft, means for frictionally connecting the pulley with the shaft, an operating mechanism for said means including a screw, and means shiftable on the shaft during the rotation thereof to revolve said screw for the purpose of adjusting it.

5. The combination of a shaft, a pulley journaled on the shaft, means for frictionally connecting the pulley with the shaft, means for operating said last-named means including a screw adjustable to vary the frictional engagement between the pulley and shaft, and means slidably mounted on said shaft to revolve said screw during the rotation of the shaft for the purpose of adjusting the screw.

6. The combination of a shaft, a pulley journaled on the shaft, clamping-jaws operable to frictionally engage the pulley and shaft together, means for operating said jaws including a screw adjustable to vary the frictional engagement of the jaws with the pulley and having crossed threads, a nut adapted to be alternately engaged with said threads, whereby when the nut is reciprocated the screw may be caused to revolve in either direction, and means for reciprocating the nut during the revolution of the shaft.

7. The combination of a shaft, a pulley journaled on the shaft, means for frictionally connecting the pulley and shaft together, means for operating the last-named means including a screw adjustable to vary the frictional connection of the pulley to the shaft, a sleeve slidable on the shaft, a shifting lever for operating the sleeve, and means connecting the sleeve with the screw operating to revolve said screw when the shifter is moved in one direction, and to cause said screw to remain stationary when the shifter is moved in the opposite direction.

8. The combination of a shaft, a friction pulley carried by said shaft having a screw adjustable to vary the frictional engagement with the shaft, means slidably carried on the shaft operable to revolve said screw in one direction, and means controlling said last-named means to cause the reciproca-tion thereof to revolve the shaft in the opposite direction.

9. The combination of a shaft, a friction pulley carried thereby having means for regulating the frictional engagement therewith comprising a screw having crossed threads, a nut carried by the screw provided with means to connect it with either of said crossed threads, a sleeve slidably splined to the shaft having a connection with the nut, a second sleeve slidably splined to the shaft connected with said nut, rings carried by said sleeves, and shifting levers for sliding the sleeves connected with said rings.

10. The combination of a shaft, a pulley journaled on the shaft, clamping-jaws for frictionally connecting the pulley and shaft together, means for operating said jaws including a screw adjustable to vary the frictional engagement of the jaws with the pulley and provided with a right and left-hand thread, nuts having a slide operable to alternately engage it with the said right and left-hand threads of the screw, a sleeve splined to the shaft and connected to the nut, a second sleeve splined to the shaft and connected with the said slide of the nut, and means for operating the sleeves.

11. The combination of a shaft, a pulley carried by the shaft having means for frictionally connecting it therewith, means for operating the last-named means including a screw adjustable to vary the frictional connection of the pulley with the shaft, a nut provided in connection with the screw operable when moved thereover in one direction to revolve said screw, and when moved thereover in the opposite direction to cause said screw to remain stationary, and means for operating the nut.

12. The combination of a shaft, a pulley carried by the shaft having means for frictionally connecting it therewith, means for operating the last-named means including a screw adjustable to vary the frictional engagement of the pulley with the shaft, a nut provided in connection with the screw operable when moved thereover in one direction to revolve said screw, and when moved thereover in the opposite direction to cause said screw to remain stationary, and means for changing the direction in which the nut revolves the screw.

13. The combination of a shaft, a pulley carried by the shaft having means for frictionally connecting it therewith, means for operating the last-named means including a screw adjustable to vary the frictional engagement of the pulley with the shaft, a nut provided in connection with the screw operable when moved thereover in one direction to revolve said screw, and when moved thereover in the opposite direction to cause said screw to remain stationary, means for changing the direction in which the nut revolves the screw, means for operating the last-named means, and independent means for operating the nut.

14. The combination of a shaft, a pulley carried by the shaft, means for frictionally securing the pulley to the shaft, means for operating the last-mentioned means including a screw, a nut receiving the screw operable when moved thereover in one direction to revolve the screw, and when moved in the reverse direction to cause said screw to remain stationary, means carried by the nut including a slide operable to cause the rotation of the screw by the nut to be reversed, a sleeve splined on the shaft for reciprocating the nut, and a second sleeve having a limited relative sliding movement to the first-named sleeve for reciprocating said slide.

15. The combination of a shaft, a pulley carried by the shaft, means for frictionally connecting the pulley and shaft together, means for operating the last-named means including a screw, a nut operable to revolve the screw when moved thereover, a radially-slotted sleeve, and a block having a reduced central portion engaged with the slot of the sleeve and connected with said nut.

In testimony whereof I have signed my name to this specification in the presence of two subscribing witnesses.

HORACE H. BALLIET.

Witnesses:
HARRY V. SIEGER,
LUTIE B. SIEGER.